United States Patent
Takeuchi

(10) Patent No.: US 8,960,716 B2
(45) Date of Patent: Feb. 24, 2015

(54) CURTAIN AIRBAG HOUSING STRUCTURE

(71) Applicant: Suzuki Motor Corporation, Shizuoka-ken (JP)

(72) Inventor: Eiji Takeuchi, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 14/164,998

(22) Filed: Jan. 27, 2014

(65) Prior Publication Data

US 2014/0265272 A1 Sep. 18, 2014

(30) Foreign Application Priority Data

Mar. 14, 2013 (JP) .................................. 2013-051657

(51) Int. Cl.
- *B60R 21/213* (2011.01)
- *B60R 21/232* (2011.01)
- *B60R 21/2338* (2011.01)

(52) U.S. Cl.
CPC .................................. *B60R 21/213* (2013.01)
USPC .................. 280/730.2; 280/728.2; 280/743.2

(58) Field of Classification Search
CPC B60R 21/213; B60R 21/232; B60R 21/2338; B60R 2021/161; B60R 2021/23386; B60R 2021/23388
USPC ................. 280/728.2, 730.2, 743.2
See application file for complete search history.

(56) References Cited

U.S. PATENT DOCUMENTS

| | | | |
|---|---|---|---|
| 6,851,710 B2 * | 2/2005 | Wong et al. | 280/743.2 |
| 7,516,978 B2 * | 4/2009 | Quach et al. | 280/730.2 |
| 7,571,927 B2 * | 8/2009 | Purvis et al. | 280/728.2 |
| 7,712,774 B2 * | 5/2010 | Garner et al. | 280/730.2 |
| 7,735,855 B2 * | 6/2010 | Jang et al. | 280/728.2 |
| 7,823,922 B2 * | 11/2010 | Mitchell et al. | 280/743.2 |
| 8,056,924 B2 * | 11/2011 | Hatfield et al. | 280/730.2 |
| 8,408,586 B2 * | 4/2013 | Ohmori et al. | 280/728.2 |
| 8,434,782 B2 * | 5/2013 | Asano | 280/730.2 |
| 8,678,427 B1 * | 3/2014 | Spamer et al. | 280/728.2 |
| 2005/0011057 A1 * | 1/2005 | Dominssini | 24/570 |
| 2012/0161460 A1 * | 6/2012 | Nakazawa et al. | 296/1.08 |

FOREIGN PATENT DOCUMENTS

| | | |
|---|---|---|
| JP | 2006-298279 | 11/2006 |
| JP | 2007-196729 | 8/2007 |
| JP | 2011-255839 | 12/2011 |

* cited by examiner

*Primary Examiner* — Ruth Ilan
*Assistant Examiner* — Laura Freedman
(74) *Attorney, Agent, or Firm* — Alston & Bird LLP

(57) ABSTRACT

The housing structure for a curtain airbag includes: an airbag body; an inflator configured to inflate and deploy the airbag body; a bracket configured to fix a base end portion of the airbag body to a roof side or a front pillar; and a tether configured to anchor a front end portion of the airbag body to the front pillar. The airbag body is wound into a long narrow shape and covered with a roof lining, and the tether and a portion fixed by the tether are covered with a front pillar trim. The bracket is disposed adjacent to a joint portion of the roof lining and the front pillar trim and has an extension piece extending along the front pillar. An end portion of the airbag body wound together with the tether or a portion of the tether adjacent to the end portion is fixed to the extension piece with a releasable binding member.

3 Claims, 4 Drawing Sheets

CURTAIN AIRBAG HOUSING STRUCTURE

CROSS-REFERENCE TO RELATED APPLICATIONS

This application claims priority from Japanese Patent Application No. 2013-051657, filed Mar. 14, 2013, which is incorporated by reference herein in its entirety.

TECHNICAL FIELD

The present invention relates to a curtain airbag housing structure in an automobile. More specifically, the present invention relates to an assembly of a curtain airbag housed in a roof side portion of an automobile and an interior member covering the curtain airbag.

BACKGROUND ART

In order to protect mainly the head of an occupant against an impact load from a lateral side of an automobile, curtain airbag systems are well known, in which an airbag housed inside an interior member in a roof side portion is inflated and deployed when an impact load is detected.

Such a curtain airbag system includes an airbag body, an inflator configured to inflate and deploy the airbag body, etc. When the curtain airbag system is mounted on a vehicle body, a base end portion of the airbag body wound into a long narrow shape is fixed to a roof side portion, and a tether configured to anchor a front end portion of the airbag body is fixed to a lower portion of a front pillar. Then, the airbag body is covered with a roof lining, and the tether and the fixed portion are covered with a front pillar trim.

At the time of mounting the front pillar trim, the position of the tether is not restricted between the front end portion of the airbag body and the fixed portion at the lower portion of the front pillar. Hence, when a clip of the front pillar trim is locked into a hole of the front pillar, the front pillar trim is mounted with the tether stuck by the clip in some cases. Furthermore, the clip, protruding from the back surface of the front pillar trim, is hardly visible from the front side. In addition, the wound airbag body has to be lifted to prevent the airbag body from hanging down while being mounted. Hence, the assembling requires a substantial amount of labor.

DISCLOSURE OF INVENTION

Problem to be Solved by the Invention

The present invention has been made in view of such circumstances. An object of the present invention is to provide a curtain airbag housing structure having a simple configuration, which can prevent improper mounting of a front pillar trim and a tether, and which is expected to have effects of simplifying the assembly operation and shortening the assembly time.

Means for Solving the Problem

In order to solve the above-described problems of the conventional techniques, the present invention is a housing structure for a curtain airbag (1). The structure includes: an airbag body (11); an inflator (12) configured to inflate and deploy the airbag body; a bracket (13) configured to fix a base end portion of the airbag body to a roof side or a front pillar; and a tether (14) configured to anchor a front end portion of the airbag body to the front pillar. The airbag body is wound into a long narrow shape and covered with a roof lining (5), and the tether and a portion fixed by the tether are covered with a front pillar trim (6). The structure is characterized in that the bracket (13) is disposed adjacent to a joint portion of the roof lining and the front pillar trim and has an extension piece (134) extending along the front pillar. An end portion (11a) of the airbag body wound together with the tether or a portion (14a) of the tether adjacent to the end portion is fixed to the extension piece with a releasable binding member (10).

Advantageous Effects of the Invention

The present invention configured as described above accordingly has effects described below.

(a) Fixing the end portion of the airbag body wound together with the tether or the portion of the tether adjacent to the end portion to the extension piece with the releasable binding member such as an adhesive tape restricts the position of the tether to the fixed position. Accordingly, assembling is performed without the tether being stuck by a clip of the front pillar trim, and the front pillar trim is mounted without considering the position of the tether.

(b) Moreover, the end portion of the airbag body wound together with the tether is directly or indirectly fixed to the extension piece. This prevents the end portion of the airbag body from hanging down, it is no longer necessary to lift the end portion of the airbag body during the mounting, and the front pillar trim and the roof lining can be easily mounted.

(c) The extension piece has such a simple configuration that the extension piece extends from the bracket. This neither increases the number of components nor increases the number of assembly steps and the production cost that would otherwise accompany the increase in the number of components. Hence, effects of simplifying the assembly operation and shortening the assembly time can be expected.

(d) Since the extension piece extends from the bracket and has a high rigidity, the operation of winding and fixing the releasable binding member (adhesive tape) to the end portion of the airbag body or the portion of the tether adjacent to the end portion can be easily and stably performed.

(e) Restricting the position of the tether to the vicinity of the door opening flange limits the area where the tether comes into contact with the front pillar trim at the time of inflating and deploying the airbag, and reduces the variation in the deployment and damage to the front pillar trim due to the inflation and deployment of the airbag.

(f) The high rigidity extension piece easily and reliably breaks the releasable binding member such as an adhesive tape at the time of inflating and deploying the airbag, and deploying the airbag does not fail.

In a preferable aspect of the present invention, edge portions (51, 61) of the roof lining and the front pillar trim along a door opening are held by a door opening trim (7, 71). The roof lining is configured to be supported against a holding force of the opening trim by a lower end of the extension piece (134) abutting a back surface of the roof lining. Accordingly, an edge end portion of the roof lining normally laid upon a back surface side of the joint portion of the roof lining and the front pillar trim is inhibited from falling, and formation of a gap is prevented between the roof lining and the front pillar trim. Thus, it is advantageous to keep a favorable appearance.

In a more preferable aspect of the present invention, at least one locking portion (64) configured to lock the front pillar trim to the front pillar is disposed near the extension piece (134) while being displaced away from the opening trim (7). This makes it possible to more reliably prevent the tether from being stuck, and the position of the clip is easily grasped. Hence, the front pillar trim is also more easily mounted.

MODES FOR CARRYING OUT THE INVENTION

Hereinafter, an embodiment of the present invention will be described in detail with reference to the drawings.

Figure 1:
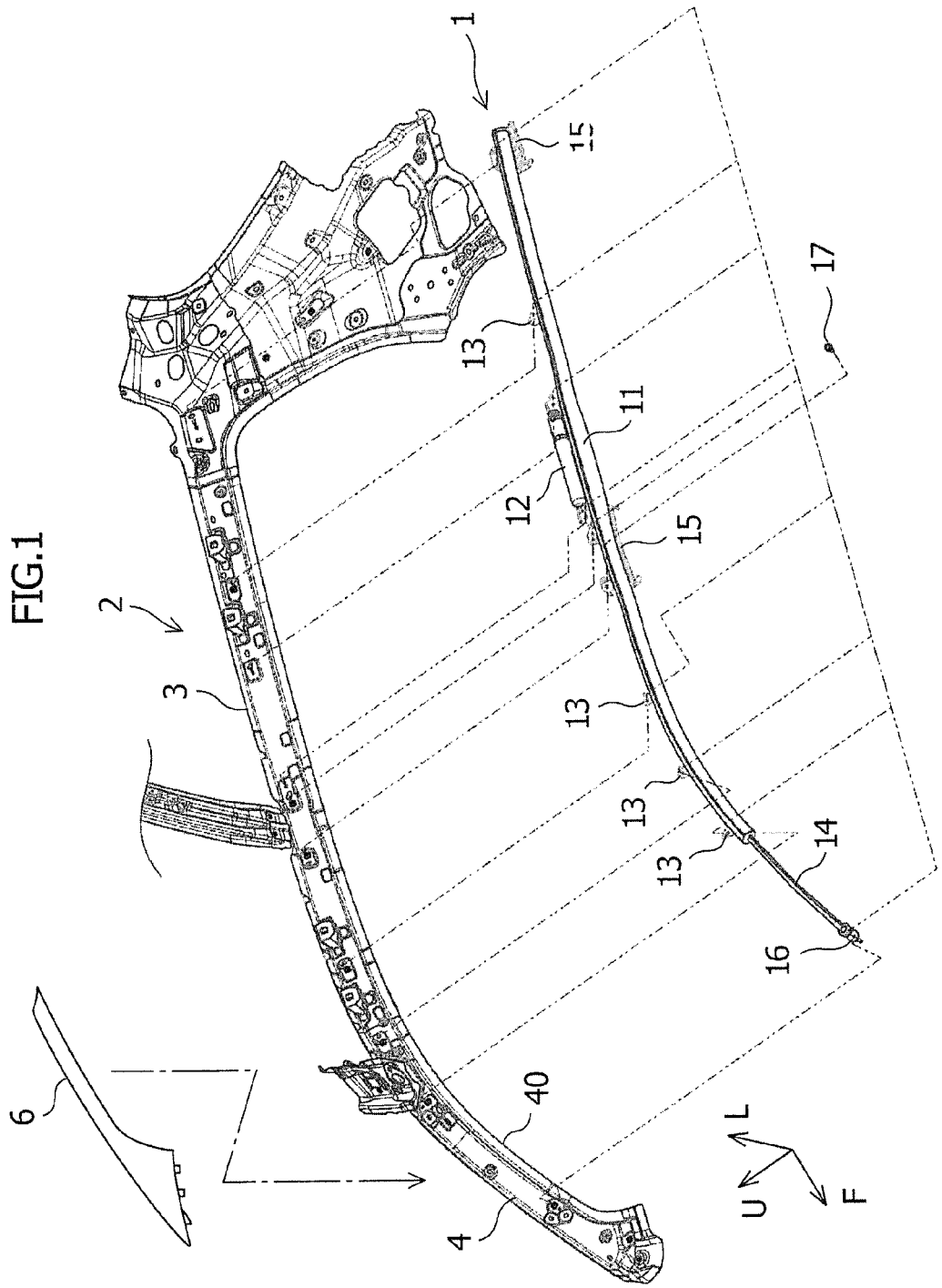
FIG. 1 is a perspective view illustrating how a curtain airbag is attached.

FIG. 1 illustrates the overall configuration of a curtain airbag 1 to which the present invention is applied and how the curtain airbag 1 is attached to a vehicle body. In FIG. 1, the curtain airbag 1 mainly includes: a curtain-type airbag body 11 deployable over a side window portion of a vehicle body 2 so as to protect mainly the head of a occupant; an inflator 12 configured to inflate and deploy the airbag body 11; multiple brackets 13, 15 configured to fix a base end portion of the airbag body 11 to a roof side 3; a tether 14 configured to anchor a front end portion of the airbag body 11 to a front pillar 4; etc.

When housed, the airbag body 11 is wound into a long narrow shape as shown in FIG. 1. In this state, the brackets 13, 15 extending to the outermost peripheral portion and both ends of the inflator 12 are fixed to the roof side 3 with bolts 17, and an anchor bracket 16 linked to a tip end of the tether 14 with another bolt 17 is fixed to the front pillar 4. Thus, a basic attachment to the vehicle body 2 is completed. Then, the airbag body 11 and the inflator 12 are covered with a roof lining 5 mounted on a ceiling portion inside a vehicle compartment of the vehicle body 2, and the tether 14 and the anchor bracket 16 are covered with a front pillar trim 6.

Figure 2:
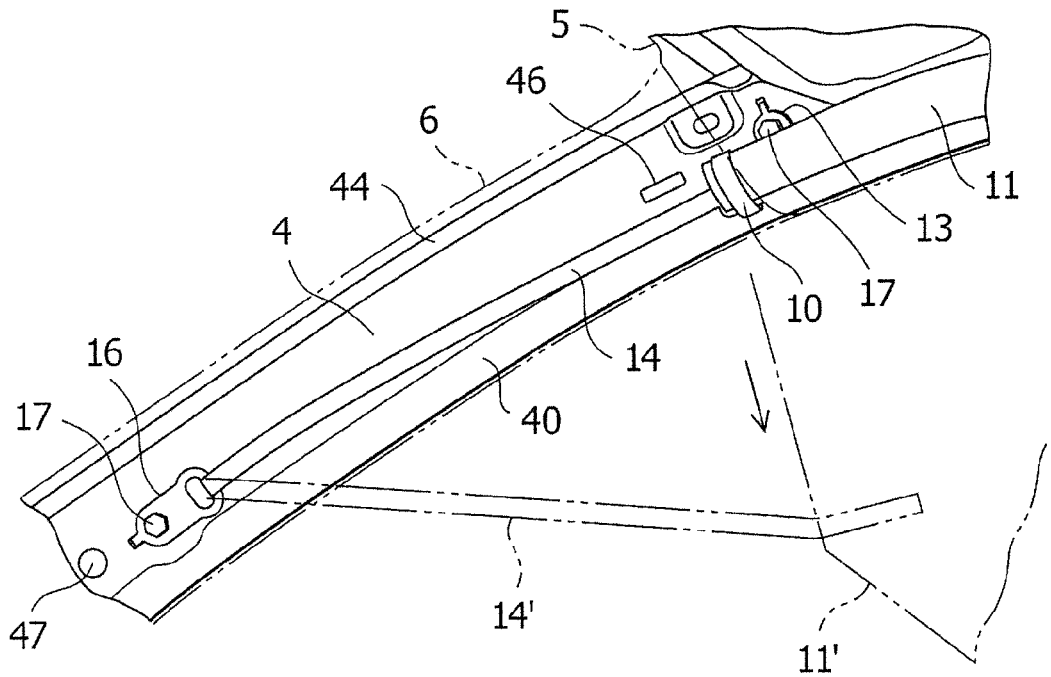
FIG. 2 is a perspective view of an upper portion of the front pillar 4 employed in a curtain airbag housing structure according to the present invention, which is seen from the inside and slightly rear side of a vehicle compartment.

FIG. 2 is a perspective view of an upper portion of the front pillar 4, which is seen from the inside and slightly rear side of the vehicle compartment. In FIG. 2, the bracket 13 fixing a front end portion 11a of the airbag body 11 is located at a joint portion of the roof lining 5 and the front pillar trim 6 at an upper end portion of the front pillar 4. The structure of the bracket 13 will be described in detail later.

Figure 5:
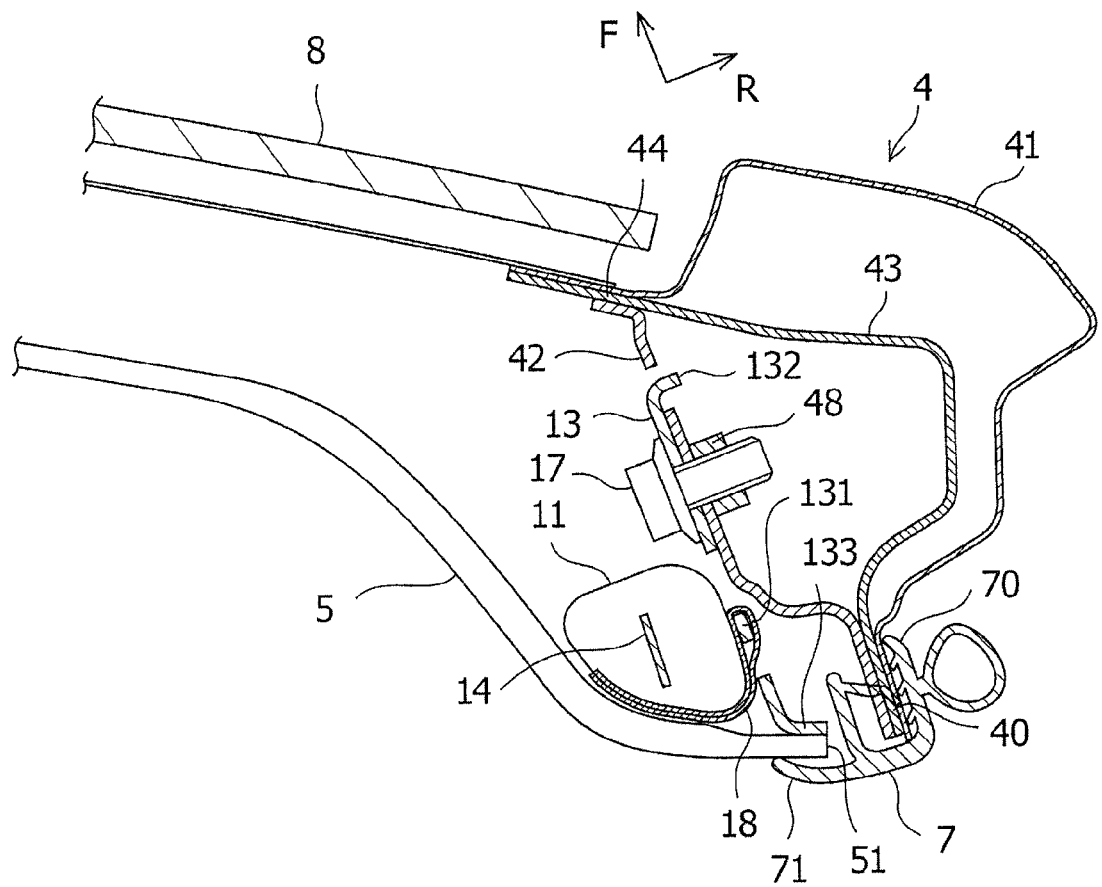
FIG. 5 is a cross-sectional view taken along the line A-A of FIG. 3(a).
Figure 6:
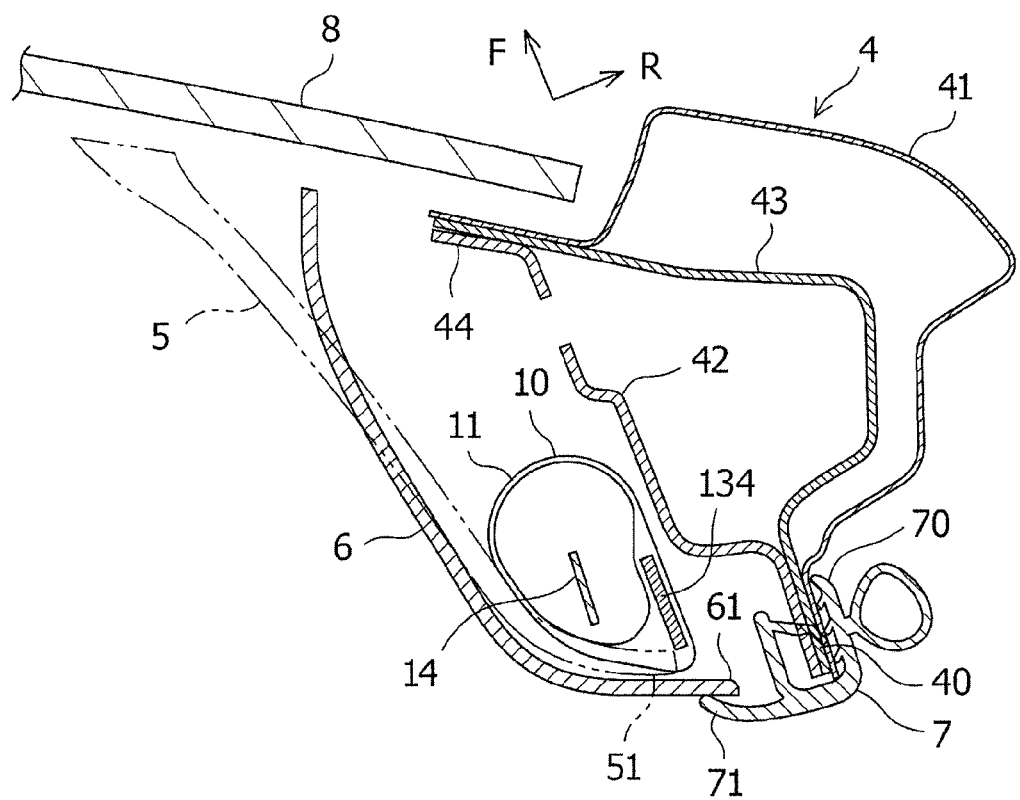
FIG. 6 is a cross-sectional view taken along the line B-B of FIG. 3(a).
Figure 7:
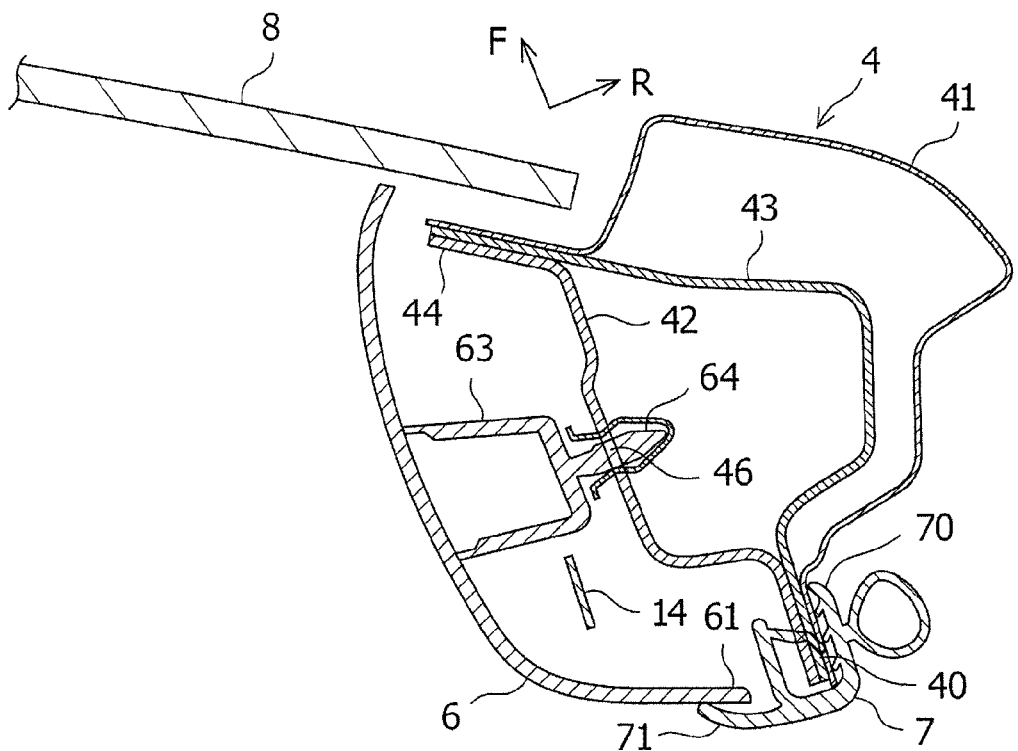
FIG. 7 is a cross-sectional view taken along the line C-C of FIG. 3(a).

As shown in FIGS. 5 to 7, the front pillar 4 has a closed structure in its cross section, in which a side body outer panel 41 and a front pillar inner panel 42 are laid upon each other respectively on an outer side and an inner side of the compartment with a front pillar reinforcement 43 sandwiched in between, and bonded together by welding at two flanges 40, 44. In the side body outer panel 41, a stepped portion configured to receive a windshield 8 and a stepped portion configured to receive an unillustrated side door are formed by pressing. A door opening trim 7 is fitted onto a door opening flange 40 configured to define a door opening.

The front pillar trim 6 is fixed to the front pillar 4 by inserting and locking clips into holes 46, 47 of the front pillar 4, the clips (denoted by reference numeral 64 in FIG. 7) protruding from a back surface of the front pillar trim 6. Moreover, as shown in FIG. 7, an edge portion 61 of the front pillar trim 6 along the door opening is elastically held by a lip portion 71 of the door opening trim 7 fitted onto the door opening flange 40. An edge portion 51 of the roof lining 5 is also similarly elastically held by the lip portion 71 (FIG. 5).

Figure 3A:
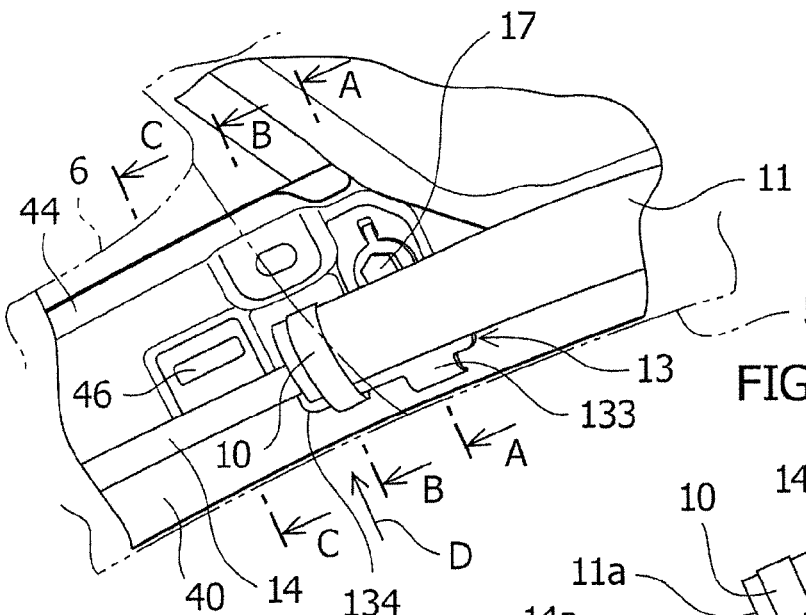
FIG. 3(a) is an enlarged view of main parts in FIG. 2.
Figure 3B:
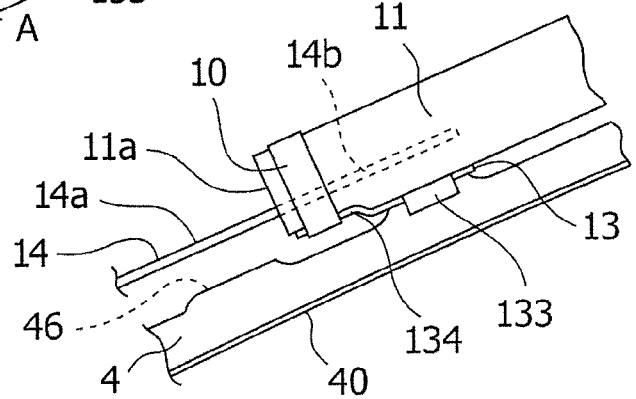
FIG. 3(b) is a view seen in the direction of the arrow D.
Figure 4:
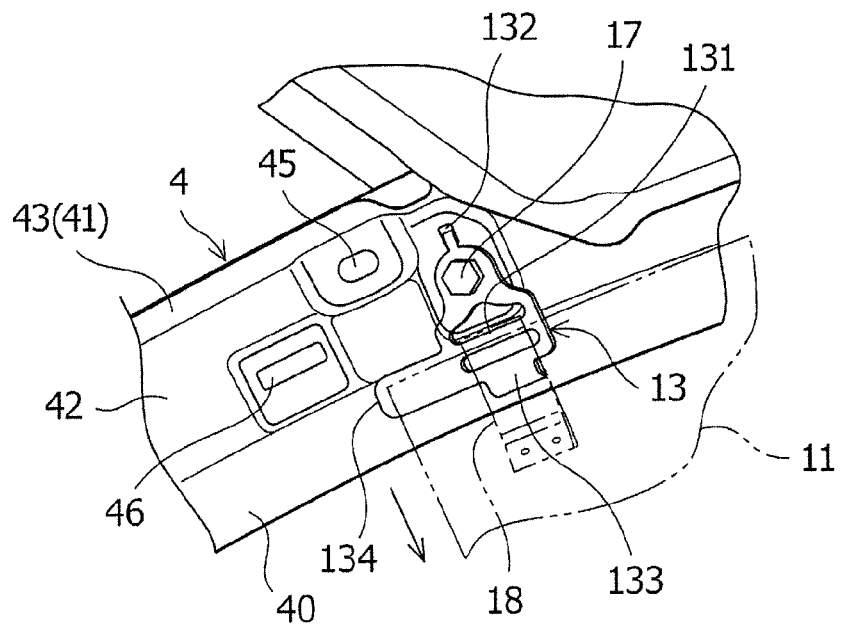
FIG. 4 is an enlarged view of the main parts in FIG. 2 with the curtain airbag being deployed.

As shown in FIGS. 3 to 5, the bracket 13 is linked to the airbag body 11 by inserting a belt 18 through a belt insertion portion 131, folding the belt 18 into a loop form, and sewing the belt 18 onto the airbag body 11. Moreover, the bracket 13 is fixed to the front pillar 4 by fastening the bolt 17 to a weld nut 48 fixed to the front pillar inner panel 42. Engaging a hook portion 132 at an upper end of the bracket 13 with a hole of the front pillar inner panel 42 inhibits the rotation of the bracket 13. A lower end of the bracket 13 is bent toward the door opening flange 40, and serves as a receiver 133 for the edge portion 51 of the roof lining 5.

Further, the bracket 13 according to the present invention has an extension piece 134 extending from the vicinity of the belt insertion portion 131 along the front pillar 4. As shown in FIG. 3 or 5, an end portion 11a of the airbag body 11 wound together with the tether 14 (14b) can be fixed to the extension piece 134 with a tape 10.

Specifically, in the production process of the curtain airbag 1, the multiple brackets 13, 15 and the tether 14 are fixed to the airbag body 11 by sewing etc. Then, the curtain airbag 1 is wound into a long narrow shape around the tether 14, and bound using the tape 10 at several positions with certain intervals in a longitudinal direction. In this case, the end portion 11a wound together with the tether 14 is fixed to the extension piece 134 of the bracket 13 with the tape 10.

Thus, at the time of the attachment to the vehicle body, the bracket 13 is fixed to the front pillar 4 with the bolt 17. By doing so, the extension piece 134 restricts the position of the tether 14 adjacent to the end portion 11a, and the tether 14 is isolated from the clip hole 46. This prevents the tether 14 from interfering with the clip 64 and a base 63 at the time of mounting the front pillar trim 6, and the clip 64 is inserted and locked into the hole 46 without the tether 14 being stuck.

In particular, the end portion 11a of the airbag body 11 does not have a portion inflated into a bag form, and has an obliquely formed corner as shown by the chain doubledashed line in FIG. 2. Hence, the airbag body 11 is wound less at this end portion 11a in comparison with the other portions, which makes it easy to move the position of the tether 14. Nevertheless, the binding with the tape 10 in advance prevents the tether 14 from floating and the end portion 11a from hanging down, and the roof lining 5 and the front pillar trim 6 are easily mounted.

Note that, as the tape 10, it is possible to use various adhesive tapes which have such durability that the tape is neither broken nor peeled due to aging deterioration in the state assembled to the vehicle body, but which are breakable by the inflation and deployment of the airbag. Other than the tape, easily-breakable binding members and easily-releasable binding members in the form of string or the like are usable, as long as they pass airbag inflation and deployment tests.

Moreover, the extension piece 134 of the bracket 13 according to the present invention also has a function as a receiver (second receiver) for the edge portion 51 of the roof lining 5 and the edge portion 61 of the front pillar trim 6, similarly to the receiver 133.

Specifically, as shown in FIG. 6, at the joint portion of the roof lining 5 and the front pillar trim 6, the edge portion 51 of the roof lining 5 is laid upon a back side of the edge portion 61 of the front pillar trim 6. Hence, the extension piece 134 receives an elastic holding force of the lip portion 71 transmitted to the edge portion 51 of the roof lining 5 through the edge portion 61 of the front pillar trim 6. Thus, there is an advantage that formation of a gap is prevented at the joint portion of the edge portion 51 of the roof lining 5 and the edge portion 61 of the front pillar trim 6, maintaining a favorable appearance at the joint portion.

When the airbag body 11 is instantly inflated by a gas jetted from the inflator 12, the tape 10 wound around the extension piece 134 is immediately broken. The roof lining 5 and the front pillar trim 6 are pushed from the back surface sides thereof. Thereby, the edge portions 51, 61 are separated from the lip portion 71 of the door opening trim 7, and the curtain airbag 1 mounted as described above is deployed toward the inside of the vehicle compartment from gaps between the edge portions 51, 61 and the lip portion 71. Then, as shown by the chain double-dashed line in FIG. 2, a front end portion of an airbag body 11' is anchored by a tether 14', and thereby the curtain airbag 1 is deployed in the form of a curtain downward along a side surface inside the vehicle compartment. In this event, since the extension portion 134 of the bracket 13 has a high rigidity, there is another advantage in that an edge portion thereof functions as a blade to reliably break the tape 10.

One embodiment of the present invention has been described above. Nevertheless, the present invention is not limited to the above-described embodiment, and various modifications and alterations can be made on the basis of the technical idea of the present invention.

For example, in the above embodiment, description has been given of the case where the end portion 11a of the airbag body 11 wound into a long narrow shape is bound and fixed to the extension piece 134 with the tape 10. Nonetheless, a portion 14a of the tether 14 adjacent to the end portion 11a may be fixed to the extension piece 134 with the tape 10. In this case, the effect of binding the end portion 11a cannot be expected. However, since the end portion 11a and the clip hole 46 are not aligned in a longitudinal direction of the tether 14, the restriction of the position of the tether 14 by the extension piece 134 prevents improper mounting and also prevents the end portion 11a from hanging down.

The invention claimed is:

1. A curtain airbag housing structure comprising: an airbag body; an inflator configured to inflate and deploy the airbag body; a bracket configured to fix a base end portion of the airbag body to any one of a roof side and a front pillar; and a tether configured to anchor a front end portion of the airbag body to the front pillar, the airbag body being wound into a long narrow shape and covered with a roof lining, the tether and a portion fixed by the tether being covered with a front pillar trim, wherein the bracket is disposed adjacent to a joint portion of the roof lining and the front pillar trim and has an extension piece extending along the front pillar, and any one of an end portion of the airbag body wound together with the tether and a portion of the tether adjacent to the end portion of the airbag body wound together with the tether is fixed to the extension piece with a releasable binding member.

2. The curtain airbag housing structure according to claim 1, wherein edge portions of the roof lining and the front pillar trim along a door opening are held by a door opening trim, and the roof lining is configured to be supported against a holding force of the opening trim by a lower end of the extension piece abutting a back surface of the roof lining.

3. The curtain airbag housing structure according to claim 1, wherein at least one locking portion configured to lock the front pillar trim to the front pillar is disposed near the extension piece while being displaced away from an opening trim.

* * * * *